(No Model.) 3 Sheets—Sheet 1.
E. T. FORD.
POTATO DIGGER.
No. 412,490. Patented Oct. 8, 1889.
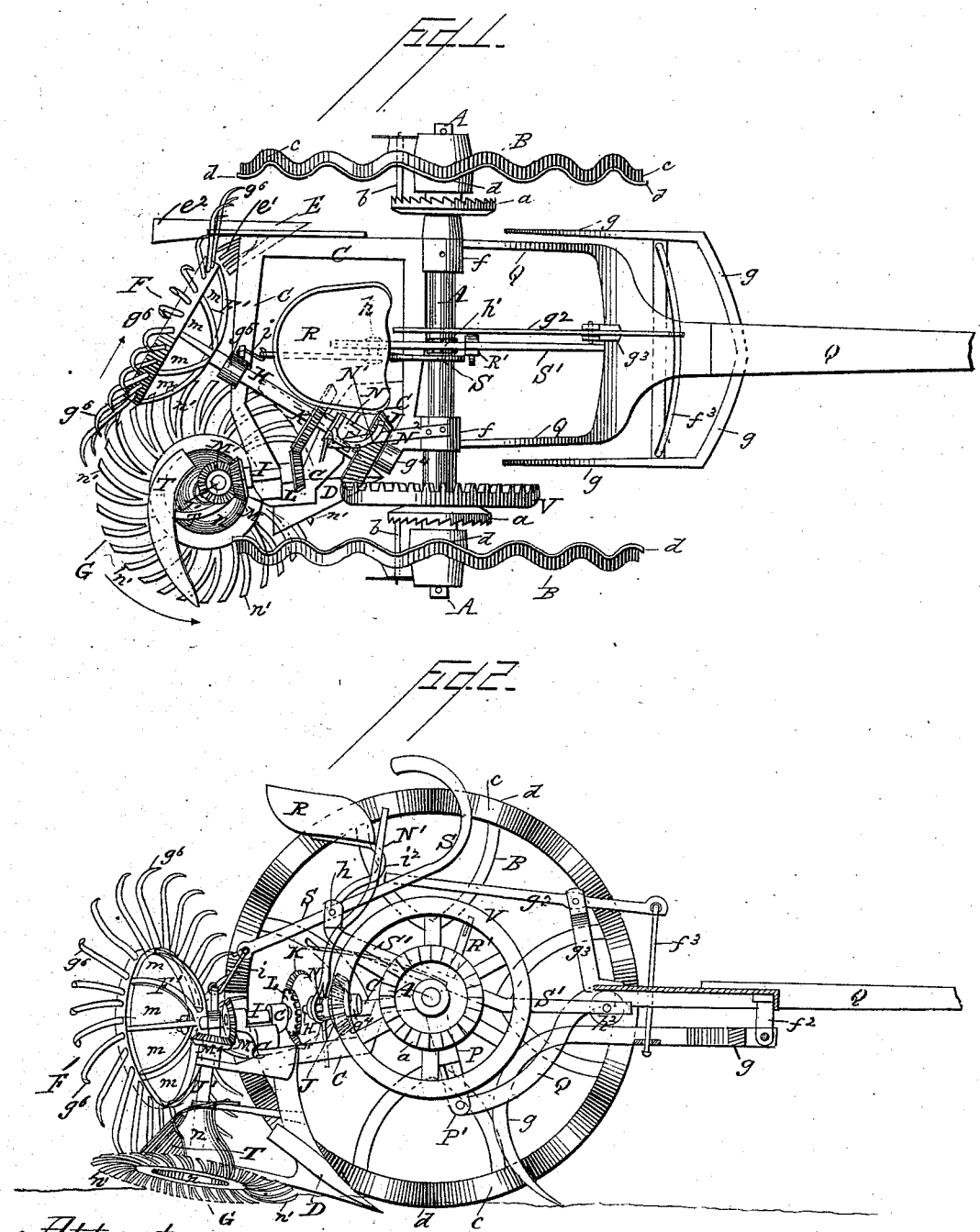
Attest:
F. H. Schott
E. T. Fenwick
Inventor:
Elias T. Ford
by his attorneys
Mason, Fenwick & Lawrence (No Model.) 3 Sheets—Sheet 2.
E. T. FORD.
POTATO DIGGER.
No. 412,490. Patented Oct. 8, 1889.
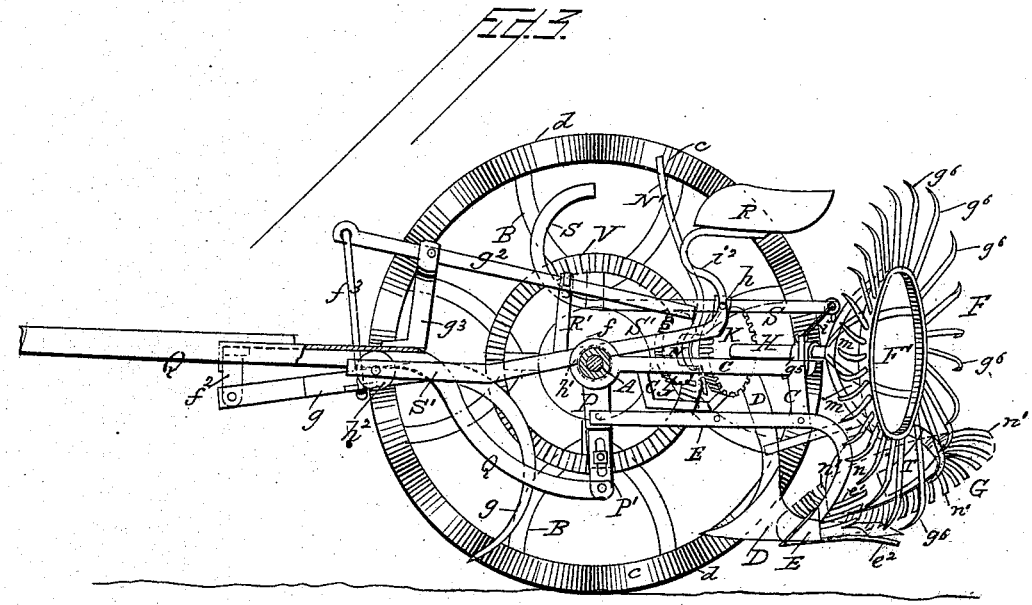
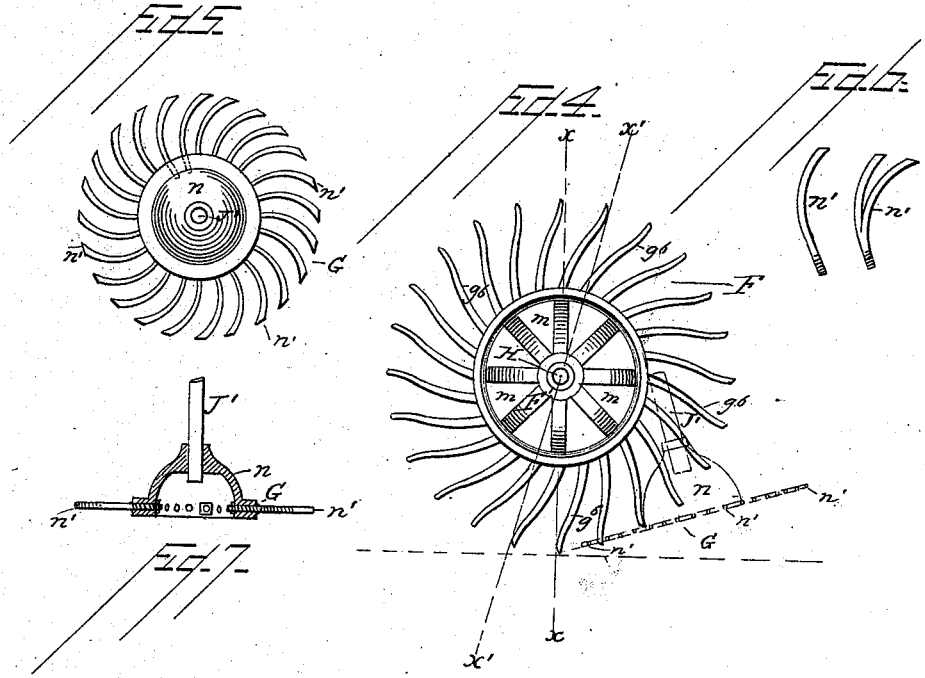
Attest:
H. H. Schott
E. J. Fenwick
Inventor:
Elias T. Ford
by his Attorneys
Mason, Fenwick and Lawrence (No Model.) 3 Sheets—Sheet 3.
E. T. FORD.
POTATO DIGGER.
No. 412,490. Patented Oct. 8, 1889.
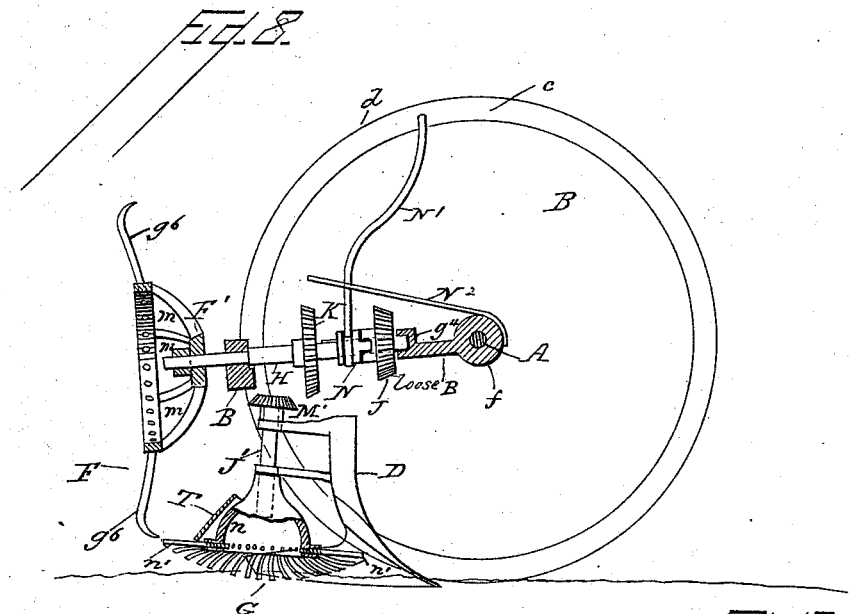
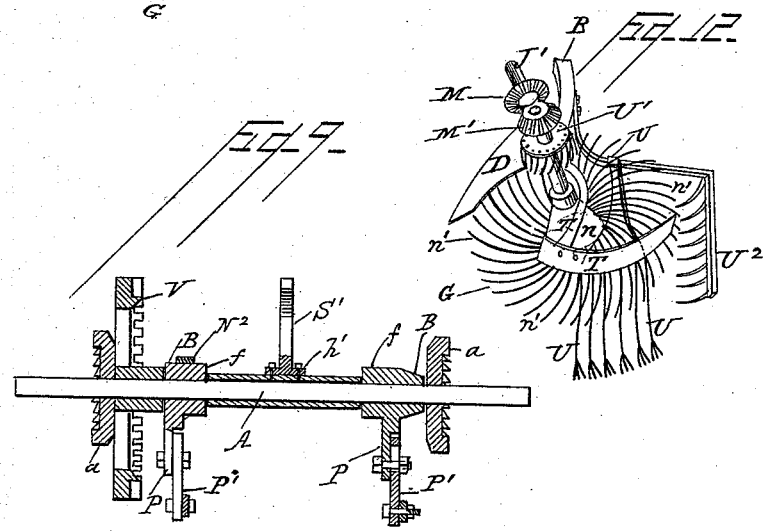
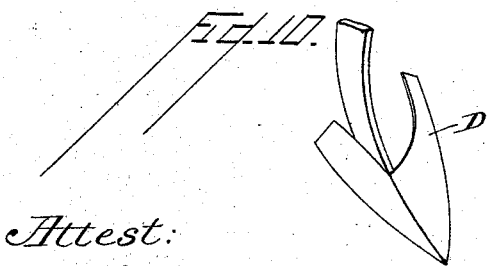
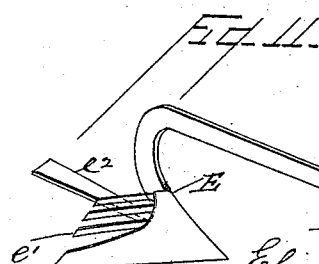
Attest:
H. H. Schott
E. T. Fenwick
Inventor
Elias T. Ford
by his attorneys
Mason, Fenwick & Lawrence

UNITED STATES PATENT OFFICE.

ELIAS T. FORD, OF STILLWATER, NEW YORK.

POTATO-DIGGER.

SPECIFICATION forming part of Letters Patent No. 412,490, dated October 8, 1889.

Application filed February 3, 1881. Serial No. 25,367. (No model.)

*To all whom it may concern:*

Be it known that I, ELIAS T. FORD, a citizen of the United States, residing at Stillwater, in the county of Saratoga and State of New York, have invented certain new and useful Improvements in Potato-Digging Machines; and I do hereby declare the following to be a full, clear, and exact description of the invention, such as will enable others skilled in the art to which it appertains to make and use the same.

My invention consists in certain novel constructions, combinations, and arrangements of parts in a potato-digging machine, as will be hereinafter described, and pointed out in the claims; and its object is to provide a potato-digging machine which, by adjustable colter-like devices, will gather and draw in the vines centrally upon the rows; by certain appliances can have its depth of draft regulated and the depth of digging adjusted and its plow-standards and other parts kept cleansed of accumulating vines and trash, and which, by means of two plowshares, will plow under each side of a potato-row, and by means of a rotary digging-wheel penetrate the thus-loosened earth of the row below the potatoes or to a proper depth, and thereby disintegrate the soil and pick up the vines and potatoes and throw them off sidewise upon a revolving conveyer separator device, and by said device separate the soil from the potatoes and vines, and thereupon, by aid of a transverse arresting and directing device, discharge the separated potatoes along with the vines upon the surface of the ground on one side of the machine ready for removal.

In the accompanying drawings, Figure 1 is a plan view of the improved potato-digging machine as adjusted for digging. Fig. 2 is a side elevation and partial section of the same viewed from right-hand side, one of the traction-wheels being removed. Fig. 3 is also a side elevation and partial section of the machine as adjusted for turning around or going to or from the field, one of the traction-wheels being removed, it being viewed from the left side. Fig. 4 is a rear diagram view of the digging-wheel as it would appear if its shaft were horizontal and of the conveyer separator-wheel, the shaft of the latter being shown in its properly inclined position, but partly broken off. This view illustrates, substantially, the relative positions of the tines of the digging-wheel and of the separator-wheel, and also demonstrates by a dotted line $x\ x$ that the entering point of a tine immediately below the hub of the digging-wheel is directly in a plane running through the shank end of a tine immediately above the hub of said wheel, and by a dotted line $x'\ x'$ that the point of a tine next to and in rear of the lowermost entering tine is in a plane with the point of a tine forward of and next to the highest tine, which construction and relative arrangement of the tines is the same throughout the series. Fig. 5 is a top view of the tined conveyer separator as it would appear if its shaft were set vertical to the horizon. Fig. 6 represents detail views of single and double pronged tines which may be used on the separator. Fig. 7 is a vertical section of the separator and a portion of its shaft, as shown in Fig. 5. Fig. 8 is a partial section and elevation of portions of the machine. Fig. 9 is a transverse section of a portion of the machine. Fig. 10 is a perspective view of the right-hand double-mold-board plow, and Fig. 11 a perspective view of the left-hand single-mold-board plow. Fig. 12 is a modification of the invention, showing a perspective view of the separator, a portion of the frame, double-mold-board plow, shield, and director, and combined therewith an auxiliary tined separator, a tined fender, and a tined vine-discharger.

A in the drawings represents an axle mounted upon two traction-wheels B B, which are to be loose while backing and fast when the machine is moving forward and alternately fast and loose while it is turning around in right and left directions. Ordinary ratchets $a$ and pawls $b$ are provided, as shown, or in any other suitable manner, for use in connection with the wheels and axles, for the purpose of allowing the wheels to become fast and loose, the pawls being fastened to the wheels and the ratchets to the axles. The wheels have rims $c$, which are serpentine in form, and above each rim a narrow sinuous flange $d$ projects. This form or construction of the traction-wheels, while giving great strength, insures a penetration into the earth by means of the flanges $d\ d$ to a sufficient depth without a liability of too great resistance to the draft-team for insuring the rotation by the traction-wheels of certain gear-wheels employed for revolving certain parts hereinafter described. Other forms of traction-wheels may be adopted, but not with such advantageous results.

Between the traction-wheels a frame C is mounted upon the axle A by means of suitable boxes $f$, which allow the frame to swing up and down in the arc of a circle. This frame extends back from the axle and forms supports for the plows D E, digging-wheel F, conveyer separator-wheel G, shafts H I J', gearing J K L M M', for transmitting the motion for operating the same, and a clutch N and clutch-lever N'. This frame is also provided with pendent draft-hangers P P', which can be lengthened or shortened as required. To these hangers the pole or tongue Q is attached, while to one of them the forward end of the beam of the left-hand plow is connected, said plow and the forward end of the right-hand plow-standard being also attached to the side beams of said frame, as shown, or in any other suitable manner. The hangers, respectively, are made in two parts, the parts P' being fitted by means of slots, bolts, and nuts to the part P, and by loosening the nuts and sliding up the parts P' the depth of draft of the team can be decreased, and by sliding said parts down it can be increased. On a pendent hanger $f^2$ of the tongue Q two curved colter-like vine-gathering hooks $g$ are hung so as just to rest upon the surface of the ground and to swing up clear of the same when necessary—for instance, as in turning the machine around. These hooks are placed in line with the points of the plows and their front arms converge toward one another, so as to unite, and are pivoted to the pendent hanger $f^2$ on the under side of the tongue. These hooks are connected by a bail $f^3$, pivoted to a standard $g^3$, and can be raised by said lever entirely off the ground by the driver from his seat R, in which position they may be latched by an ordinary stop-standard R', which also may answer by means of stops on its opposite side for latching up the frame C. The frame C is suspended in rear of the axle by means of a bail $i$, or other suitable device, upon a compound lever S S', upon which the driver's seat R is mounted, the part S being pivoted at $h$ to an upright seat-standard portion $i^2$ of part S', while part S' is pivoted on the axle at $h'$. On the front end of part S' a roller $h^2$ is applied, and said roller bears underneath the tongue and rolls along the same when the frame C, with its attachments, is swung up or down by the part S, or whenever the tongue is caused to vibrate by a back pull or a forward thrust of the frame through its pendent hangers P P', to which the tongue is pivoted. This arrangement of the leverage S S' insures a balancing of the weight of the frame and tongue and attachments thereof upon the axle, and secures the benefit of the weight of the driver for holding up the tongue, the traveling roller on the front end of the lever S' bearing upward during the operation of lifting the frame by part S of the compound lever, and also when the machine is in motion the axle and tongue jointly sustain the whole strain and weight, while all necessary vibrations of the seat and tongue are permitted by the sliding of the front end of the lever and its attached roller upon the under side of the tongue. The plow D, which is placed in front of the conveyer separator-wheel G, is similar to a double shovel, being provided with a double mold-board, and it is wide enough to completely guard the separator. This plow turns away dirt, stones, and vines to the right and left from the separator, and protects it from becoming clogged in its revolutions. The plow E, which is placed in front of the tined digger F, near the extreme left thereof, has a single mold-board, and this is constructed in form of long narrow fingers $e'$, with spaces between them, whereby it is enabled to act as an auxiliary separator on the left side of the potato row. The sole $e^2$ of this plow is extended back in form of a long flat bar, and said bar is free from the short landside and mold-board beyond its front attachment to the plow, and it is constructed of stout steel or other suitable metal which can be adjusted and set, by bending or by other suitable means, for raising or depressing its heel end, so that it may stand with a greater or less inclination downward from the horizon. When set to stand at a greater downward inclination than that shown in the drawings, the plow will enter the earth to a less depth, because the heel of the sole will tend to keep the point up, and when set with a lesser downward inclination the depth of plowing will be increased, because the said heel will permit the point to pitch downward. By means of this adjustable sole the depth of plowing and digging is regulated, and by it and the plow E the frame and all its attachments are sustained on the left side of the machine. The shaft H of the digging-wheel F is set diagonally upon the frame C, and also inclined downward from a horizontal plane, so as to have its inner end turn in a box $g^4$ at the extreme right side of the frame C and its outer end stand about centrally between the plows, while near its middle portion it is supported in a box $g^5$ on the rear end bar of the frame. This arrangement of the shaft H gives the digging-wheel F a suitable pitch backward from the lowest to the highest points of its circumference and throws its tines $g^6$ in proper position for clearing the plow E of vines and trash. The shaft J' of the conveyer separator-wheel G is set with a downward inclination both backward and sidewise from a perpendicular, so as to give the separator an inclination from the horizon from its inner and front to its rear and outer points, as shown, or in any other equivalent manner. The digging-wheel F is preferably made with an incline-surfaced hub F', which is preferably semi-spherical in form on its front surface, concave on its rear surface, and with openings $m$ through it for the escape of dirt, vines, and trash, and this hub is terminated with a rim cast with it, or it may be encircled by a broad band, and in either construction it is provided with holes for the insertion of screw-threaded tines $g^6$ of the shape represented, and preferably fastened in place by nuts on their ends. Said tines are inclined backward from the plane of rotation of the wheel as they extend from the hub, and are twisted on a curve in a reverse direction to that in which they are caused to revolve for a portion of their length, and for the remainder of their length are curved and twisted forwardly in the direction of the plane of rotation of the wheel, or so as to point in the line of draft of the machine to an extent which brings the point of a tine which is extending from the bottom of the hub and which is entering the earth in line with the shank of a tine which is extending out from the top of the hub, and so on throughout the whole series of tines as they successively come into action, as clearly illustrated in the drawings. By this construction the hub F' of the digging-wheel forms a guard against vines wrapping around its shaft, it acting to shed the vines and conduct them and trash away from the shaft on which the wheel revolves, while the tines enter the ground spirally or in about the same manner as a series of screw-points, and by their peculiar curvature and divergence sidewise and backwardly from their shank ends pierce the hill-row, gather the potatoes and vines, and discharge the same to the right upon the conveyer separator. The diameter of this wheel from tip to tip of its tines may be about two-thirds the diameter of the traction-wheels, and its tines may extend leftwardly considerably beyond the left-hand plow-standard and in such relation thereto as to clear away in their revolution such trash and vines as may collect about said standard and carry the same toward the center of the row of potatoes and off to the right side of the machine. The conveyer separator-wheel G is preferably made with a hub $n$ of truncated-cone form, or other equivalent or suitable shape, and with tines or teeth $n'$, curved in a reverse direction to the revolution of the separator-wheel, as shown, said teeth being either single or double pronged, as illustrated. The separator, when on the lower end of its shaft, is similar to a rotary mold-board having an upward inclination sidewise and backward from the point where its inner left-hand portions about touch the horizontal surface left by the sole of the plow which precedes it. The diameter of this separator-wheel from tip to tip of the tines is preferably such that the points of the tines of the digging-wheel form with the tines of the separator a continuous incline-plane separating-support for the vines, potatoes, and all other substances dug out and thrown off by the digging-wheel in its revolutions, as illustrated in Fig. 4 of the drawings. The curving of the separator-tines in a reverse direction to the revolution of the wheels avoids clogging of the tines and insures a shedding and free discharge of the trash and substances during the revolution of the separator. Above the tines, and partly around the hub of the separator, a curved inclined shield and director T is fastened to the frame B, as shown. The lower edge of this shield and director stands very nearly transverse of the tines and extends to the end of the tines on the right side of the hub. By this arrangement and construction of the shield and director T the vines, potatoes, and trash are swept off in the most perfect manner during the revolution of the tines under and past the shield and director, their escape being greatly facilitated by the curvature of the tines in a direction the reverse of their revolution. During the passage of the vines, potatoes, and trash over the separator the rotary motion of the separator and its inclined position insure and cause an agitation of the same, and the potatoes are separated from the dirt and vines, and a large portion of the dirt is caused to escape between the tines before the potatoes and vines are discharged at the extreme right side of the separator.

I have contemplated employing with my machine a series of auxiliary stationary tines U, (see Fig. 12,) attached to a plate suitably fastened to a bracket of the frame B or other support, and in sandy soil this answers a good purpose; but such auxiliary separator is not necessary for the successful operation of my machine. I also have contemplated employing a revolving tined disk U', applied around the separator-shaft J' for the purpose of aiding in carrying along vines and trash; but while this device might serve in some machines a useful purpose its use is not necessary for the successful operation of my machine. I also have contemplated the use of a tined fender $U^2$, applied on the frame of the machine and set away from the separator a proper distance for preventing the potatoes being thrown off too far. This device may also be dispensed with, as it is not necessary for the successful operation of the machine.

For giving motion to the shaft H and digging-wheel F, carried by it, a beveled gear-wheel V is fastened rigidly on the axle A. This bevel-wheel gears with a correspondingly-beveled clutch pinion-wheel J, and when the traction-wheels B B are revolved forward a rapid revolution is imparted to the shaft H and digging-wheel F in the direction of the arrow. About midway of the shaft H another beveled wheel K is applied, which gears with a beveled wheel L on an inclined diagonal shaft I. This latter shaft carries a smaller beveled wheel M, which gears with a correspondingly-sized beveled wheel M' on the upper end of the separator-shaft J' and revolves said shaft and separator with a much greater speed than that of the digging-wheel, and thus produces a more violent agitation of the substances deposited by said digging-wheel upon the separator than would be effected if the separator and digging-wheel revolved at uniform speeds. The clutch of the pinion J slides on the shaft H and is operated by the lever N', which, as before stated, may fit in suitable stop-notches of a bar of the frame in the usual manner.

The operation of the machine is as follows: A row of potatoes is straddled and the machine drawn forward, and, as it moves, the vines are gathered and turned inward upon the center of the row, and simultaneously the plows penetrate the earth a suitable depth, preferably below the potatoes. As the plowing proceeds the traction-wheels B B set the gearing of the digging-wheel and separator in motion, and the power is transmitted to the digging-wheel and separator, and the tines of the digging-wheel are caused to penetrate the earth to a depth, preferably below the potatoes, and to lift the potatoes and vines and adhering earth to the surface, the tines all the time acting to disintegrate the mass. As soon as the tines have thus collected the potatoes, vines, and earth they throw the same laterally and divergently upon the conveyer separator, whereupon the whole is violently agitated and separated and carried off in nearly the same direction, they being prevented from passing around forward of the separator by the inclined transverse shield and director T, and by said shield, in conjunction with the motion of the separator-wheel and the curvature of the tines thereof in a reverse direction to their rotation, are thrown off upon the surface of the ground at the right side of the machine. If during the operation vines collect on the standard of the left-hand plow, the tines of the digging-wheel carry them away to the right-hand side of the machine; and if stones and stumps come in the way of the digging-wheel and separator the driver swings the frame and its attached parts up out of the way of the same by means of the part S of the compound lever S S'. The vine-gathering hooks are also raised out of the way by the hand-lever $g^2$, the said adjustments being also made when it is necessary to turn the machine around.

What I claim as my invention, and desire to secure by Letters Patent, is—

1. In a potato-digging machine, an earth-penetrating rotary digging-wheel having tines bent backward from their shank ends on curved inclines and divergent in reverse direction to their rotation and terminated in spirally-twisted ends turned toward the line of draft of the machine, substantially as and for the purpose described.

2. In a potato-digging machine, an earth-penetrating rotary digging-wheel F, having an incline-surfaced hub F' and tines $g^6$, bent backward from their shank ends on curved inclines and divergent in reverse direction to their rotation and terminated in spirally-twisted ends turned toward the line of draft of the machine, substantially as and for the purpose described.

3. In a potato-digging machine, an earth-penetrating rotary digging-wheel F, having an incline-surfaced hub F', with discharge-openings $m$ through it, and armed with tines $g^6$, bent backward from their shank ends on curved inclines and divergent in reverse direction to their rotation and terminated in spirally-twisted ends turned toward the draft of the machine, substantially as and for the purpose described.

4. In a potato-digging machine, a rotary conveyer separator-wheel which is inclined from its outer highest portion to its inner lowest portion downwardly, inwardly, and forwardly, and has its tines divergent in reverse direction to their rotation, said conveyer discharging the potatoes and adhering substances laterally on one side of the machine, substantially as described.

5. In a potato-digging machine, in combination, a driving-gear V, a gear J, a diagonal shaft H, a supporting-frame C, and a rotary digging-wheel F, having tines $g^6$ bent backward from their shank ends on curved inclines, and divergent in reverse direction to their rotation, and terminated in spirally-twisted ends turned toward the line of draft of the machine, substantially as described.

6. In a potato-digging machine, in combination, a conveyer separator-wheel, a shielding and discharging director arranged transversely of the said wheel and the line of draft, and a backwardly and laterally inclined revolving shaft carrying the conveyer separator-wheel, substantially as and for the purpose described.

7. A rotary conveyer separator-wheel having all of its upper surface, outside its hub, on the same plane from its inner lowest point of contact with the ground to its upper outer highest point, in combination with a shielding and discharging director arranged transversely of the said wheel and the line of draft, substantially as and for the purpose described.

8. In a potato-digging machine, in combination, the supporting-frame C, hung to vibrate on the axle A, a diagonal shaft H, an oblique shaft I, a shaft J', inclined from its upper to its lower end from a vertical line both backwardly and sidewise, gears for operating said shafts, a rotary digging-wheel, and a rotary conveyer separator-wheel, substantially as described.

9. In a potato-digging machine, a rotary conveyer separator-wheel, a rotary digging-wheel, and the specified gearing for driving the wheel and separator and giving a relatively faster revolution to the separator than to the digging-wheel, substantially as described.

10. In a potato-digging machine, in combination, the frame C, carrying plows and digging and separator wheels, and hung on the axle, and having pendent hangers made in two parts, and the pole or tongue Q, substantially as described.

11. In a potato-digging machine, in combination, the frame C, hung on the axle A, compound lever S S', one part pivoted on the axle and extended under the pole or tongue, and also forming a standard for the driver's seat, and the other part connected to said frame, digging and separator wheels, and plows, substantially as described.

12. In a potato-digging machine, in combination, a vibrating frame C, hung upon and in rear of a transverse axle A, a tongue or pole pivoted to said frame, two supporting-wheels, one or both of which being capable of actuating the driving mechanism of the machine, a diagonal shaft H, gear V on the axle and gear J on the shaft H, a rotary digging-wheel which penetrates the earth to a depth sufficient for digging the potatoes out of the row and discharges the potatoes, vines, and other adhering substances obliquely on one side of the machine, and two plows D E, preceding the digging-wheel, for plowing, respectively, under the right and left sides of the potato row, substantially as described.

13. In a potato-digging machine, in combination, the axle A, supporting-wheels B, vibrating supporting-frame C, pivoted tongue Q, vine-gatherers $g$ $g$, plows D E, digging and conveyer separator-wheels F G, shielding and discharging director T, gearing for operating said wheels, and levers and clutch for controlling the parts, substantially as described.

14. In a potato-digging machine, in combination, a vibrating frame C, hung on axle A and carrying digging and conveyer separator-wheels, and a plow E, having an adjustable sole-plate $e^2$ and arranged on the left-hand rear portion of said frame, whereby the frame with its attached parts is mainly sustained on the left side of the machine, and the plow and digging-wheel and separator-wheel can be adjusted to operate at different depths, substantially as described.

15. In a potato-digging machine, in combination, the plow E and a tined digging-wheel F on an inclined diagonal shaft, the tines of said wheel serving for clearing the plow-standard and its mold-board of vines and trash, substantially as described.

16. The traction-wheels having a serpentine rim $c$ and extended in diameter by a narrow serpentine flange $d$, substantially as described.

17. In a potato-digging machine, in combination, a conveyer separator-wheel G and a backwardly and laterally inclined revolving shaft J' on one side of the machine, carrying said separator, substantially as described.

18. In a potato-digging machine, in combination, the main rotary conveyer separator-wheel G and the auxiliary separator U beneath it, substantially as and for the purpose described.

In testimony whereof I hereunto affix my signature in presence of two witnesses.

ELIAS T. FORD.

Witnesses:
 E. T. FENWICK,
 ROBT. L. FENWICK.